(12) United States Patent
Mercier

(10) Patent No.: US 8,662,375 B2
(45) Date of Patent: *Mar. 4, 2014

(54) METHOD AND SYSTEM FOR RETREADING TRACK WHEEL

(76) Inventor: Craig Mercier, Harmans, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,303

(22) Filed: Apr. 30, 2012

(65) Prior Publication Data

US 2012/0211471 A1    Aug. 23, 2012

Related U.S. Application Data

(63) Continuation-in-part of application No. 13/046,524, filed on Mar. 11, 2011, now Pat. No. 8,177,115.

(60) Provisional application No. 61/313,470, filed on Mar. 12, 2010.

(51) Int. Cl.
*B23K 31/00* (2006.01)

(52) U.S. Cl.
USPC .......................................... 228/119; 228/225

(58) Field of Classification Search
None
See application file for complete search history.

(56) References Cited

U.S. PATENT DOCUMENTS

| | | |
|---|---|---|
| 1,519,029 A | 12/1924 | Gollwitzer |
| 2,909,642 A | 10/1959 | Landis |
| 3,002,081 A | 9/1961 | Wenzel |
| 3,184,839 A | 5/1965 | Gerlach |
| 3,207,881 A | 9/1965 | Pagan |
| 3,266,702 A | 8/1966 | Parent et al. |
| 3,526,948 A | 9/1970 | Stern et al. |
| 4,540,870 A | 9/1985 | Kaufmann |
| 4,711,146 A | 12/1987 | Lung et al. |
| 4,918,805 A | 4/1990 | Liszka et al. |
| 5,773,779 A | 6/1998 | Morlock |
| 5,825,655 A | 10/1998 | Nakagawa et al. |
| 5,914,055 A | 6/1999 | Roberts et al. |
| 5,927,167 A | 7/1999 | Naumann et al. |
| 6,128,820 A | 10/2000 | Nolan et al. |
| 6,347,550 B1 | 2/2002 | Kroening et al. |
| 6,494,683 B1 | 12/2002 | Nolan et al. |
| 6,746,064 B1 | 6/2004 | Petrek et al. |
| 2003/0029845 A1 | 2/2003 | Tamura et al. |

(Continued)

FOREIGN PATENT DOCUMENTS

| | | |
|---|---|---|
| JP | S54-126646 A | 10/1979 |
| JP | 2003-305569 A | 10/2003 |

(Continued)

OTHER PUBLICATIONS

Derwent-Acc-No. 1996-050034 Falconer et al. Corresponds to ZA-9500959A (1996).

*Primary Examiner* — Kiley Stoner
(74) *Attorney, Agent, or Firm* — Rosenberg, Klein & Lee

(57) ABSTRACT

A wheel resurfacing method and system for resurfacing a worn track wheel to its original profile are provided. The system comprises a support for maintaining the worn railway wheel, a welding device, a controller, and a surface processing device. The worn railway wheel's circumferential surface defining a flange and a tread surface is reconstituted using a welding material. The welding device and the worn railway wheel rotate one relative to the other at a predetermined rate to adaptively aggregate annular welding beads along the circumferential surface to form a curvilinear profile slanted away from the flange. A surface processing device is then actuated to smooth the welded layer to form a substantially uniform surface to reconstitute the worn railway wheel to its original profile.

7 Claims, 9 Drawing Sheets

(56) References Cited

U.S. PATENT DOCUMENTS

| | | |
|---|---|---|
| 2004/0014405 A1 | 1/2004 | Boms et al. |
| 2006/0042436 A1 | 3/2006 | Closmann |
| 2006/0266122 A1 | 11/2006 | Pagano et al. |
| 2006/0272746 A1 | 12/2006 | Kapoor et al. |
| 2007/0075192 A1 | 4/2007 | Mian et al. |
| 2008/0000947 A1 | 1/2008 | Derrien et al. |
| 2008/0202296 A1 | 8/2008 | Heimann |
| 2009/0078689 A1 | 3/2009 | Brass et al. |
| 2009/0090163 A1 | 4/2009 | Mian et al. |
| 2010/0005935 A1 | 1/2010 | Ross |
| 2010/0064811 A1 | 3/2010 | Kroning et al. |
| 2010/0076631 A1 | 3/2010 | Mian |
| 2011/0101717 A1 | 5/2011 | Zdrojewski |

FOREIGN PATENT DOCUMENTS

| | | |
|---|---|---|
| KR | 10-0759842 B1 | 9/2007 |
| RU | 2041785 C1 | 8/1995 |
| RU | 2095211 C1 | 11/1997 |
| RU | 2106949 C1 | 3/1998 |
| RU | 2121420 C1 | 11/1998 |
| RU | 2143962 C1 | 1/2000 |

METHOD AND SYSTEM FOR RETREADING TRACK WHEEL

RELATED APPLICATION DATA

This Application is a Continuation-In-Part patent application of application Ser. No. 13/046,524, filed 11 Mar. 2011, now U.S. Pat. No. 8,177,115, which is based on Provisional Patent Application No. 61/313,470, filed 12 Mar. 2010.

BACKGROUND OF THE INVENTION

The subject method and system for retreading a track wheel is generally directed to reconditioning and/or reworking worn wheels for various vehicles operated on track rails. The subject method and system provide for their restoration, such that the wheels may be re-used rather than discarded. More specifically, the subject method and system are directed to the 'retreading' of such a worn track wheel sufficient to reconstitute its original profile.

Railway-type track wheels such as these are used on various types of vehicles, both powered and non-powered. Locomotives, railroad cars, cable cars, mining cars, wagons, coaches, and the like are but a few examples. In most track wheeled vehicles, power is applied by driving some or all of the track wheels, with traction relying on friction between the track wheel—typically formed of steel—and the railway tracks, which are typically also formed of steel or other metallic material.

During the course of repeated use, the wheels of these vehicles and track wheels wear out due to friction, slipping, and constant load against the railway track. Some track wheels tend to wear out more rapidly because they are typically formed of steel having a generally low Rockwell hardness as measured on a Rockwell hardness Scale.

Track wheels are typically formed of metallic material, such as steel. They are formed generally with a tread portion that slightly tapers inward from an outer flange portion. This keeps laterally opposed wheels engaged on the rail tracks they ride on. However, there tends to be slippage between the flange of a given wheel and the track rail it engages, leading to pronounced wear of the wheel's flange area. The tread of the wheel also tends to wear from the lateral swaying of the railway vehicle which tends to result, especially when the vehicle travels at higher speeds.

Other surfaces of the wheel may experience pronounced wear, depending on the particular use to which it is subjected. For instance, track wheels often encounter excessive wear at and around their exposed lateral side surfaces. The lateral side portions typically at both the flanged and opposing unflanged sides of the wheels tend to suffer premature wear due to repeated contact with switching, retarding, or other track mechanisms and hardware. In particular, those surfaces extending down from a tip of the flange down its side away from the tread repeatedly encounter frogs, switches, and retarders on typical railways that whose abrasive contact eats away at the wheel surfaces there over time.

Typically, once the track wheel is worn at its various surfaces, as determined by applicable safe operating standards—such as for safe minimum thickness of the flange—the wheel is disposed of. It is not unusual for railroad maintenance vehicles to wear through multiple sets of wheels during a typical year of operation. Invariably, this is at considerable replacement cost.

As shown in FIG. 1, a track wheel 100 includes a flange 110 at one side and a tread 120 having a tapered surface which extends from the flange to an opposing side 130. The flange 110 on the peripheral region of the track wheel 100 and the tapered tread 120 keep the track wheel from falling or sliding off the railway tracks. When a railway vehicle travels through a bend, the track wheel 100 does not pivot and displaces laterally off-center. The tapered profile of the tread acts as a self-centering correction mechanism to force the vehicle to travel true, but over time, the flange 110 and tread 120 surfaces wear out. Once worn, the track wheel 100 becomes unusable.

There are various systems known in the art relating to track wheels. For example, U.S. Pat. No. 1,519,029 is directed to a process for renovating worn flanged wheels. This reference first mentions the method of turning down a steel 'tyre' in which material is removed from the wheel to sculpt a new surface results in loss of valuable material. This method necessitated the need to match the wheel on the opposing side of the axle with the same amount of material removed.

The reference prescribes filling of material from the worn-down contour line B to the line E, then shaping the surface according to the prescribed contour line D. The approach is to keep quite close to the worn down tread so that the desired shape can be obtained with minimal cutaway of original material. The sectional surface to be obtained is limited on the one hand by B and E and on the other hand by D and comprises only a small fraction of that which would have had to be removed by the prior method. Accordingly, waste of the wheel's costly material turned to scrap is minimized. However, the fill material is limited to the flange area E. Part of the wheel material is necessarily turned down thereafter to obtain the prescribed contour line D.

U.S. Pat. No. 6,746,064 is directed to a composite wheel for tracked vehicles. The reference prescribes a wheel and flange of heat treated steel suitable for a particular end use. A portion of the inside surface of wheel flange, including the area of frictional contact between the wheel flange and rail, is machined away. A welded overlay of low friction material is applied to replace the material removed from an inside surface of flange.

Such known references, however, fail to provide a suitable system or method for resurfacing a worn track wheel to reconstitute its various portions, such as the tread and flange surfaces, to their original profile as disclosed herein.

SUMMARY OF THE INVENTION

It is therefore an object of this present invention to provide a wheel resurfacing system and method for resurfacing a worn track wheel to its original profile.

This and other objects are attained by a wheel resurfacing system formed in accordance with the present invention for resurfacing a worn track wheel substantially to an original profile. The system comprises a support unit holding the worn track wheel, the worn track wheel having a circumferential surface defining a flange and a tread surface. The welding unit corresponds to said support unit for applying a welding material to the worn track wheel upon relative displacement between the welding unit and the worn track wheel. A controller is coupled to the welding unit, the controller selectively actuates the welding unit to adaptively aggregate a plurality of annular beads of the welding material along the circumferential surface to form a welded layer, with each annular bead extending to substantially encircle a portion of the circumferential surface. The welded layer thereby forms a curvilinear profile along the circumferential surface. A surface processing device is selectively actuated to smoothe the welded layer to form a substantially uniform surface to reconstitute the worn track wheel to the original profile.

In certain exemplary embodiments, a wheel resurfacing and fortifying system for resurfacing a worn railway wheel substantially to an original profile is provided. The system comprises a support unit holding the worn railway wheel, the worn railway wheel having a circumferential surface defining flange and tread regions extending between laterally opposed side regions. A welding unit corresponds to the support unit for applying a welding material to the worn railway wheel upon relative displacement between the welding unit and the worn railway wheel, the welding material having a Rockwell hardness greater than the worn railway wheel. A controller is coupled to the welding unit, which controller selectively actuates the welding unit to adaptively aggregate a plurality of annular beads of the welding material along the circumferential surface to form a welded layer. Each annular bead extends to substantially encircle a portion of the circumferential surface. The annular beads are disproportionately aggregated at preselected portions of the circumferential surface, whereby the welded layer forms a curvilinear profile tapered along the circumferential surface. A surface processing device selectively actuates to smooth the welded layer and form a substantially uniform surface to reconstitute the worn track wheel to the original profile.

In certain other exemplary embodiments, a method for resurfacing a worn railway wheel substantially to an original profile is provided. The method comprises the step of supporting the worn railway wheel and a welding device, whereby the worn railway wheel and the welding device rotate one relative to the other at a predetermined rate. Annular beads are formed from a welding material and adaptively aggregated along a circumferential surface of the worn railway wheel to form a welded layer. The circumferential surface defines at least a flange and a tread surface, and each annular bead extends to substantially encircle a portion of the circumferential surface. The welded layer thereby forms a curvilinear profile tapered along the circumferential surface. The welded layer is surface processed to define a substantially smooth surface contour and thereby substantially reconstitute the worn railway wheel to the original profile.

Those skilled in the art will appreciate the scope of the present invention and realize aspects thereof after reading the following detailed description of the preferred embodiments in association with the accompanying illustrative figures.

BRIEF DESCRIPTION OF THE DRAWINGS

The accompanying illustrative figures incorporated in and forming part of this specification depict several aspects of the invention, and together with the description serve to explain the principles of the invention.

DETAILED DESCRIPTION OF THE PREFERRED EMBODIMENTS

Figure 1:
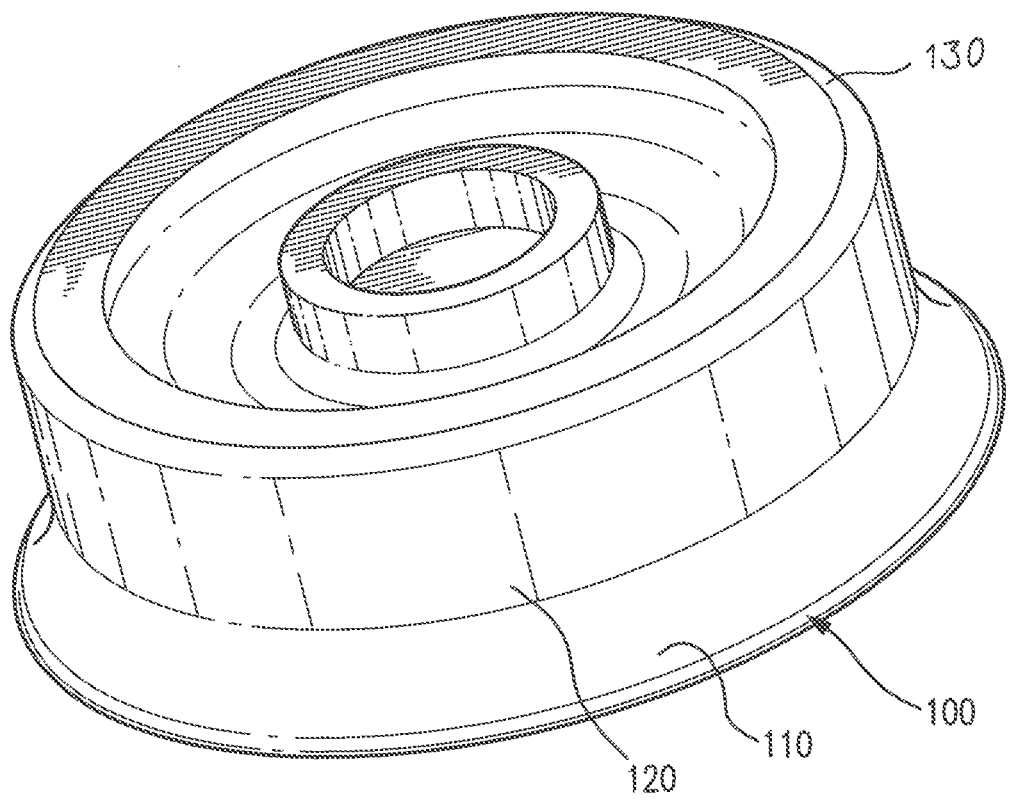
FIG. 1 is a diagram illustrating an unused track wheel in accordance with an exemplary embodiment of the present invention.

The embodiments set forth below represent the necessary information to enable those skilled in the art to practice the invention and illustrate the best mode of practicing the invention. In light of the illustrated Figures and the following description, those skilled in the art will understand the concepts of the invention and recognize applications of these concepts not particularly addressed herein. It should be understood that these concepts and applications fall within the scope of the disclosure and accompanying Claims.

Wherever possible in the following description, similar reference numerals will refer to corresponding elements on parts of different Drawings unless otherwise indicated.

Figure 2:
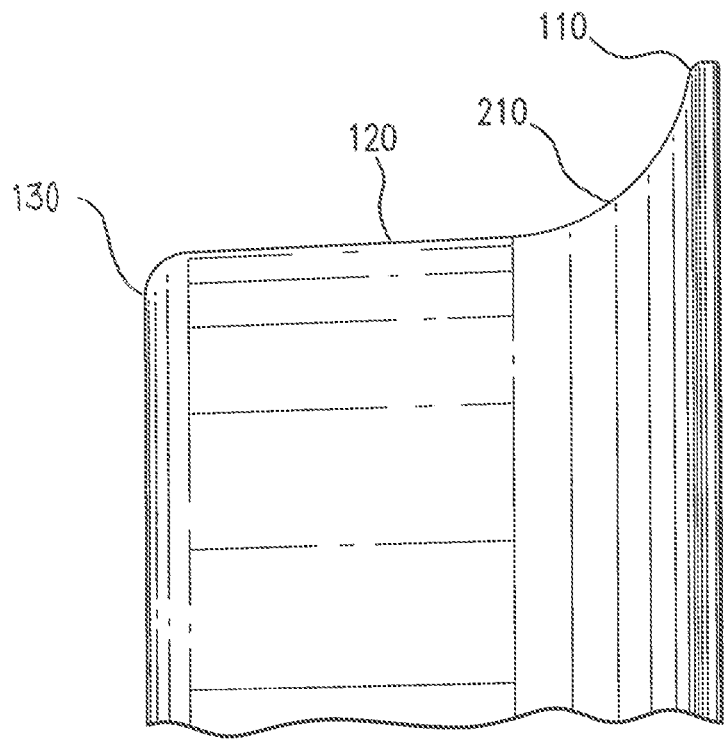
FIG. 2 is a diagram illustrating a profile of an unused track wheel in the embodiment depicted in FIG. 1.

Referring to FIGS. 1 and 2, there is a depiction of a new, unworn track wheel 100. FIG. 2 depicts a cut away section of a profile of the unworn track wheel 100; the flange 110 is shown having an integral taper region 210 that tapers away from the flange 110. The integral taper region 210 extends from the flange 110 past the tread surface 120 (which extends to a lateral side 130) to cause a self-centering effect when a pair of opposing track wheels 100 comes down onto opposed rail tracks, and also for lateral support on the on the tracks. The self-centering effect derives from the cradling that results between the rails when opposing integral taper regions 210 bearing down on the track rails. The track wheel 100 will wear from friction due to normal use, which includes self-centering and turning that applies lateral pressure onto the integral taper region 210 extending between the flange 110 and the tread surface 120. The frequency of use, type of application, and hardness properties of the track wheel determine the rate of wear of the integral taper region 210 and tread surface 120.

Depending on the particular use to which it is subjected, the track wheel 100 tends to also experience pronounced wear at and around its exposed lateral side surfaces. That is, the circumferential peripheries of the side wall portions outside both the flange 110 and at the end of the tread surface 120 typically suffer premature wear due to repeated contact with switching, retarding, or other track mechanisms and hardware. Such track hardware is used to re-direct or brake rail cars by applying, and maintaining as necessary, contact with one or both lateral sides of the rail cars' track wheels. The tip and wall surfaces of the track wheels at both inner and outer lateral sides the track wheels consequently encounter frogs, switches, and retarders on typical railways—whose abrasive contact eat away at the wheel surfaces there over time.

Figure 3:
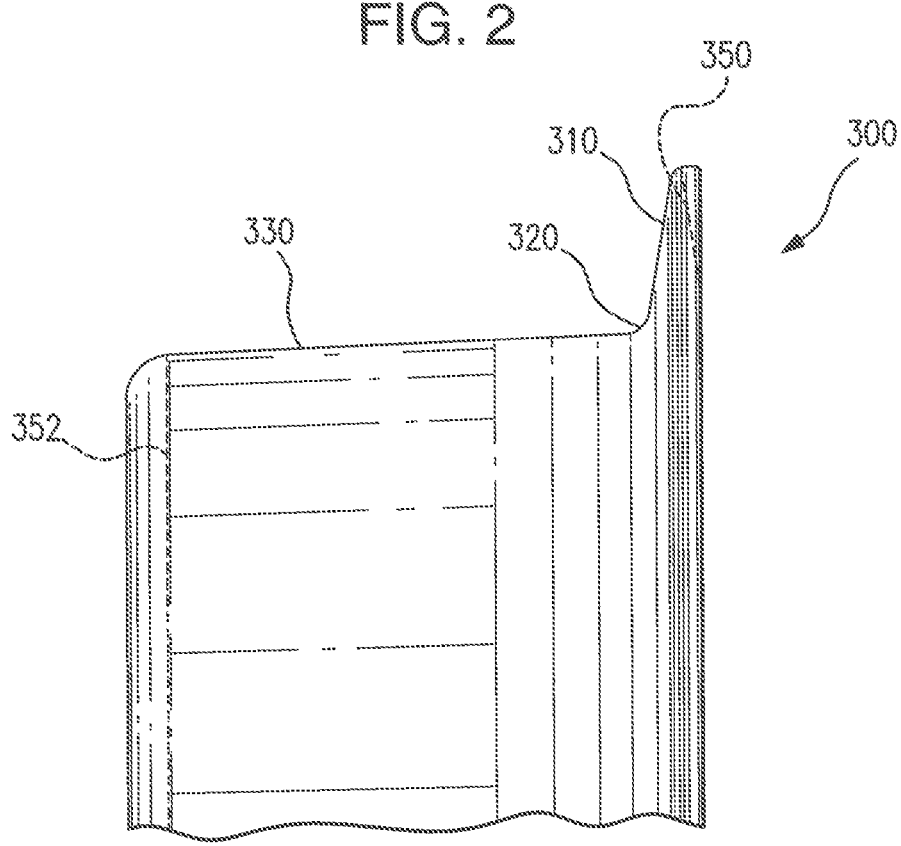
FIG. 3 is a diagram illustrating a worn track wheel in accordance with an exemplary embodiment of the present invention.

FIG. 3 depicts a worn integral taper region 210 that results in an acute taper region 320, worn tread surface 330 and worn-out flange 310. The wheel's worn areas typically also include the lateral side regions 350, 352 eaten away by abrasive contact with track hardware. In accordance with a preferred embodiment of the invention, the acute taper region 320 and the tread surface 330, as well as the worn lateral side regions 350 and 352, are reconstituted. The worn-out flange 310, acute taper region 320 and worn tread surface 330 create a potential hazard for any railroad vehicle. The worn-out flange 310 becomes dangerously vulnerable to cracking off, thereby causing the railroad vehicle to derail on a railway track. Applicable safety standards often determine how thick the worn-out flange 310 must be for safe use. When the diameter of the flange 310 is measured and determined worn, the wheel can no longer be used safely, and is often disposed of. In addition to the compromised structural integrity caused by the worn-out flange 310, the acute taper region 320 and worn tread surface 330 lead to a more pronounced side-to-side swaying of the given railway vehicle. The side-to-side swaying motion exacerbates the wearing of the worn-out flange 310 and acute taper region 320 due to frictional heating. Due to its loss of tapering profile, a tread surface 330 that is worn flat will cease to provide the self-centering effect, causing the worn track wheel 300 to travel off-center over a track rail. The worn-out flange 310 will then incur prolonged sliding contact with the edge of the rail. The worn lateral side regions likewise pose potential hazards to railroad vehicles for much the same reasons, in addition to degradation in responsiveness to switching, retarding, and other such track control mechanisms.

To reconstitute and rebuild the worn-out flange 310, acute taper region 320, worn tread surface 330, and worn lateral side regions 350 and 352, the worn track wheel 300 is preferably sampled to determine the metallurgical properties of the wheel. In accordance with a preferred embodiment, the metallurgical properties of the wheel are used to determine a welding rod having compatible properties.

Figure 8:
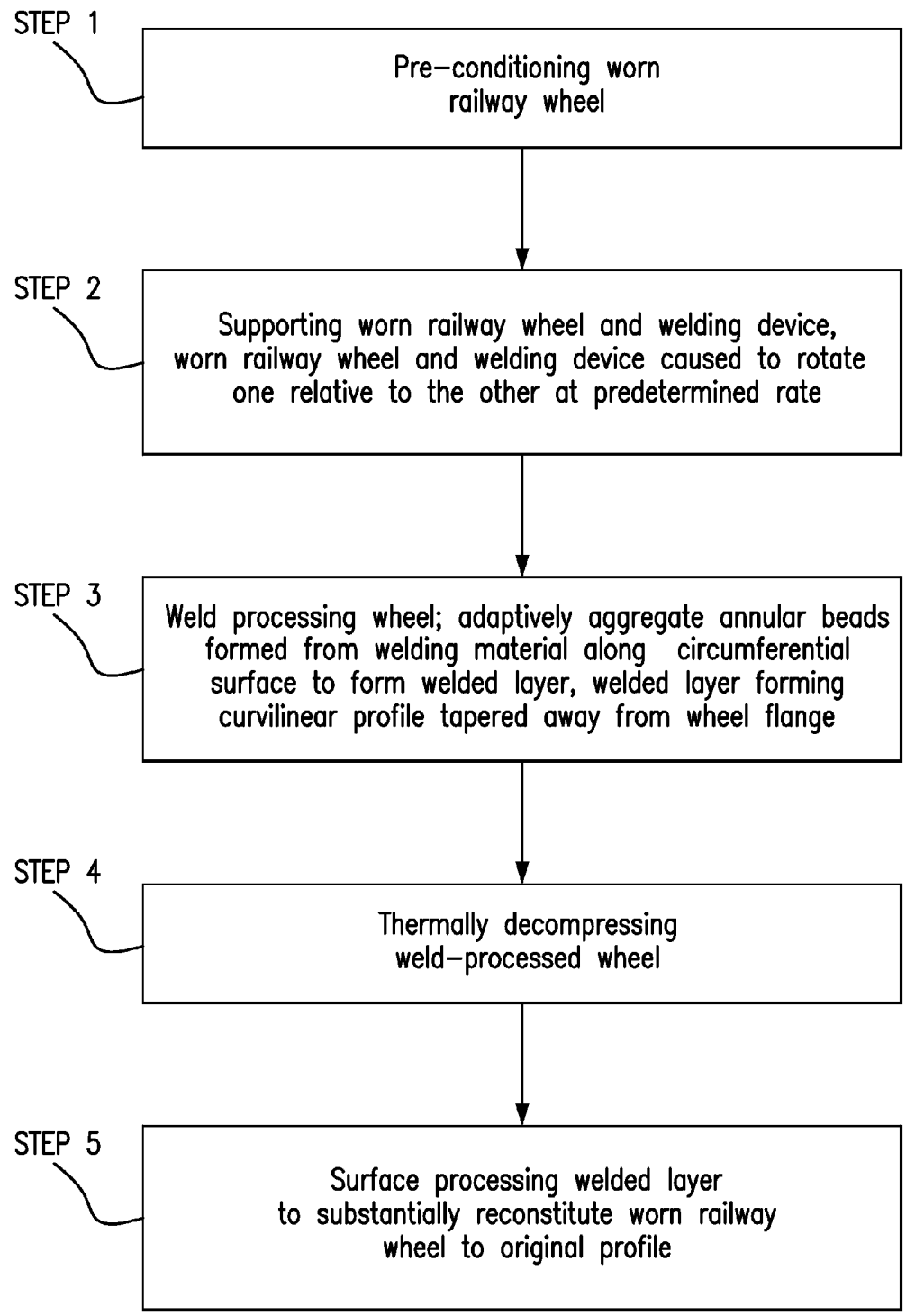
FIG. 8 is a diagram illustrating the step of reconstituting a worn track wheel in accordance with one exemplary embodiment of the present invention.

Turning briefly to the flow of processes illustrated in FIG. 8, a worn track wheel 300 may be resurfaced to reconstitute the wheel back to its original profile preferably according to the following steps. In Step 1, the worn track, or railway, wheel 300 is pre-conditioned for processing not only by being analyzed to determine its metallurgical properties, but also cleaned and, if necessary, subjected to grinding or suitable other preparatory treatment. This adapts the wheel surface for further treatment by removing impurities such as rust and debris formed or lodged in the surface of the wheel.

Preferably, the analysis of the wheel undertaken in Step 1 includes x-ray or any other suitable imaging of the wheel's internal structure. This checks for internal cracks or other faults in the wheel's worn structure (not readily visible on the surface) which may compromise its structural integrity enough to preclude safe re-use, even in resurfaced and reconstituted form. Faulty wheels are thus screened and discarded as necessary.

Depending on the material composition of the wheel, moreover, Step 1 may further include a pre-heating process, whereby the worn track wheel is preheated to a predetermined temperature (such as 500° to 700° F., for example). Such pre-heating serves to prepare the wheel's metallic material for the welding material, making it more receptive to the new material (which has been selected in suitable manner for material compatibility with the wheel). Especially where higher pre-heating temperatures are used, pre-heating treatment of the worn wheel is preferably carried out in situ, with the wheel mounted in position on the given support/table for weld processing.

Figure 7A:
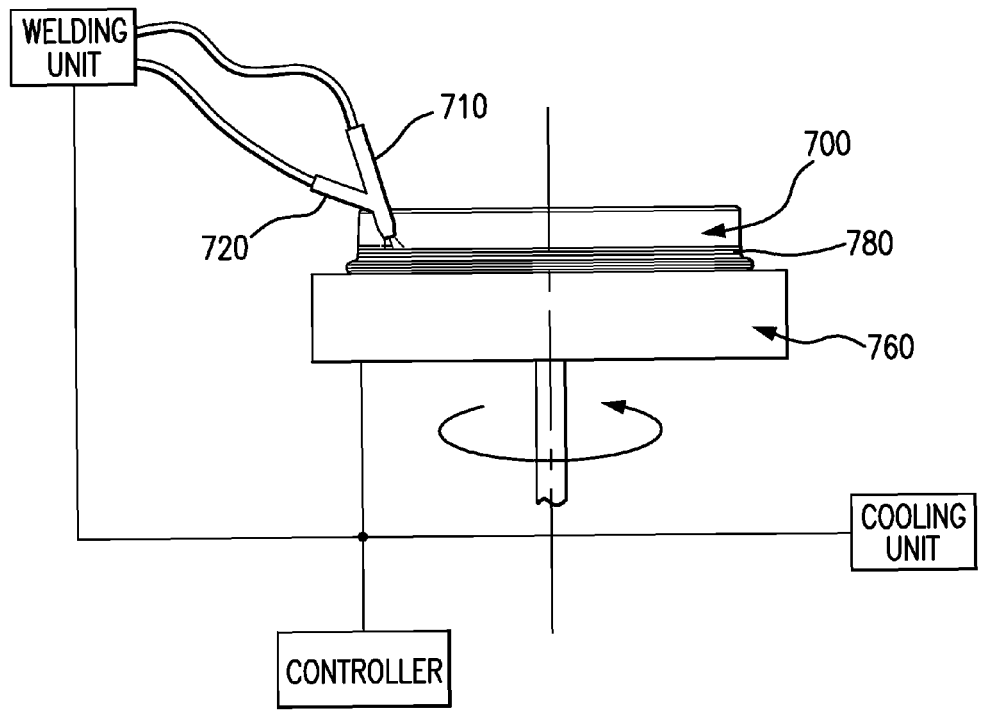
FIG. 7A is a diagram illustrating a system setup for resurfacing a worn track wheel in accordance with an exemplary embodiment of the present invention.
Figure 7B:
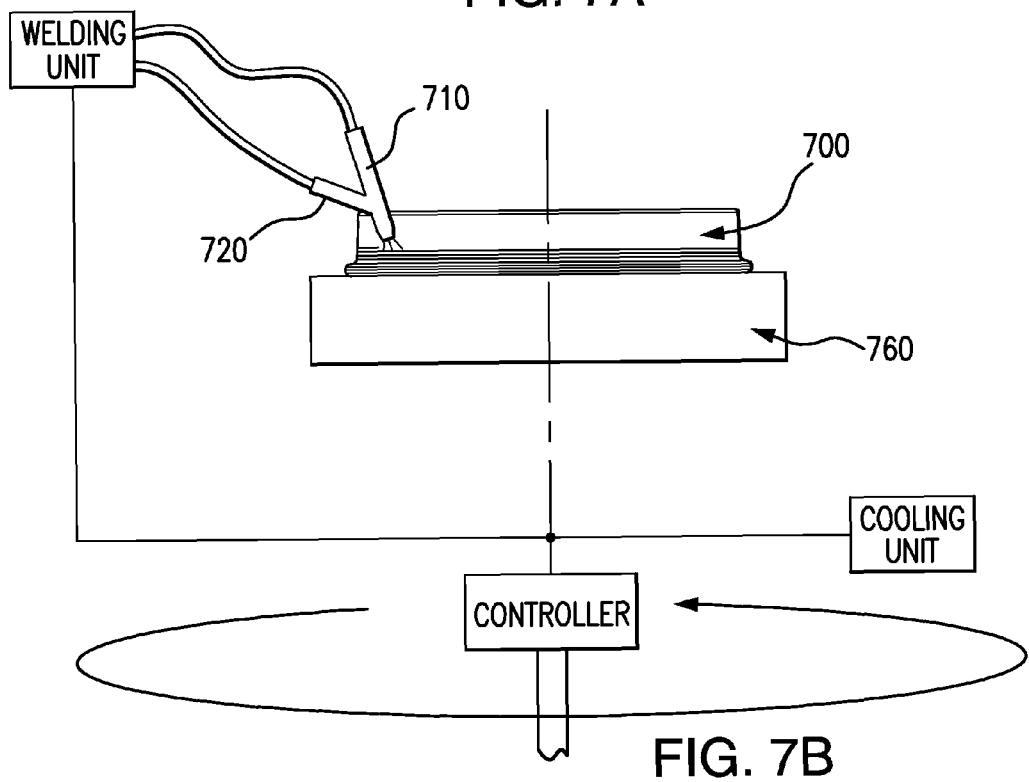
FIG. 7B is an alternate embodiment of the system depicted in FIG. 7A.

In Step 2, which may or may not be combined with Step 1 depending on the requirements of a particular application, the wheel is mounted on a support or table (such as support 760 in FIGS. 7A-7B). The support/table holds the worn track wheel for subsequent processing by a welding device. Either or both of the track wheel and welding device is rotated such that relative rotation is effected at a predetermined rate therebetween, preferably in controlled manner.

In Step 3, the wheel is weld-processed. As described in following paragraphs, a plurality of annular beads of welding material are adaptively aggregated in controlled manner upon a circumferential surface of the worn track wheel as it undergoes turning displacement relative to the welding device. This forms a welded layer having a suitable curvilinear profile tapering away from the wheel flange. Sufficient welding material is applied to form the welded layer that subsequent surface processing suitably removes just the newly-added layer, rather than diminishing any portion of the original/native material of the track wheel. A similar welding process is preferably carried out to so that the welded layer extends sufficiently to cover the worn lateral side regions of the track wheel.

Preferably in Step 4, the weld-processed wheel is thermally 'decompressed' to preserve its reconstituted structure. That is, the very hot, just weld-processed wheel is gradually lowered in temperature back to ambient ranges. A controlled cool-down of the newly-reconstituted wheel reduces the potential for warping, cracking, or other such effects of metal fatigue and the like, due to overly rapid cool down. Various processes may be used to control cool-down, such as progressive, stepped decreases in the wheel's immediate thermal environment over a predetermined time period. Suitable heating measures may be employed, for example, to step the wheel's temperature down in stepped decrements from, say, 750° F.-to-500° F.-to 450° F.-to 350° F.-to 250° F.-and so on down to ambient temperature, with the temperature being maintained at each step for a certain dwell time, such as 20 or 30 minutes, as appropriate for the particular requirements of the intended application.

The controlled thermal environment may be provided in any suitable manner. For example, the entire wheel support/table assembly may be disposed within an oven-type assembly. Alternatively, one or more heating elements may be disposed about the mounted wheel to apply the required levels of controlled heating to progressively lower the wheel's temperature.

In step 5, the weld-processed and sufficiently cooled wheel undergoes surface processing to recover its original, unworn profile. Preferably, this includes the use of such things as a milling or grinding member to grind the welded layer down to the required surface contour. In the disclosed example, a grinding stone is employed to form a substantially uniform, and even polished, surface which restores a like-new original profile for the wheel.

Figure 4A:
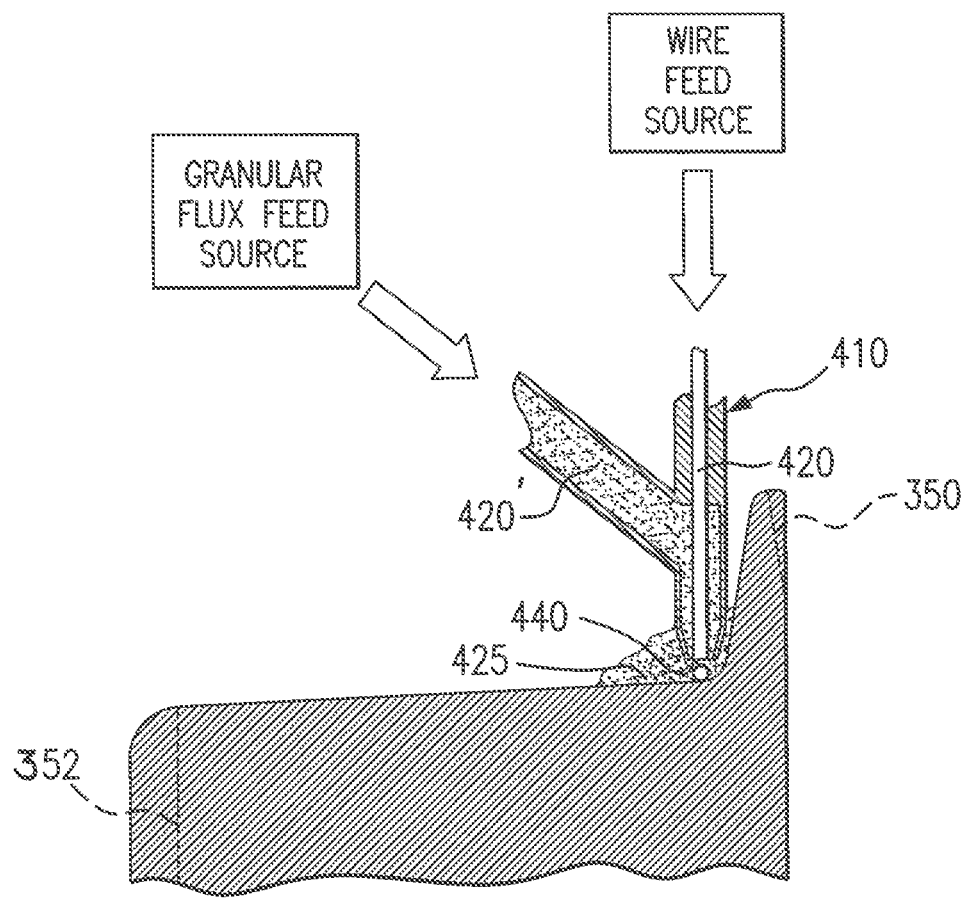
FIG. 4A is a diagram illustrating a welding device reconstituting the worn surfaces of the track wheel in accordance with an exemplary embodiment of the present invention.

Turning back to FIGS. 4A and 4B, a welding device 410 is used to form weld beads 430 on the worn track wheel 400. Weld beads 430 are formed by the device's suitably depositing welding material from its tip 440 as the worn wheel is turned relative to the device. In accordance with another aspect of the present invention, the weld beads 430 used to reconstitute the worn wheel 400 are preferably harder (higher Rockwell) than the worn track wheel 400. While other suitable welding processes may be employed, a submerged arc welding process is preferably employed in the disclosed embodiment for maximum weld integrity. In this process, a wire-like rod of welding material 420 is fed through the device 410, along with a stream of granular flux material 420' (like sand or the like). The granular flux material 420' is fed in at a controlled rate to establish and maintain an airtight flux covering 425 about the welding point. The welding of weld bead 430 therefore occurs submerged within this flux covering 425, such that the formation of potentially harmful air pockets and the like in the resulting welded layer is inhibited. As the wheel is turned, granular flux material which falls from the wheel after forming the covering 425' is recovered and recycled back to the granular flux feed source, while the granular flux material 425' is continually replenished through the device 410 to continually maintain the covering 425 about the instantaneous welding point.

Figure 4B:
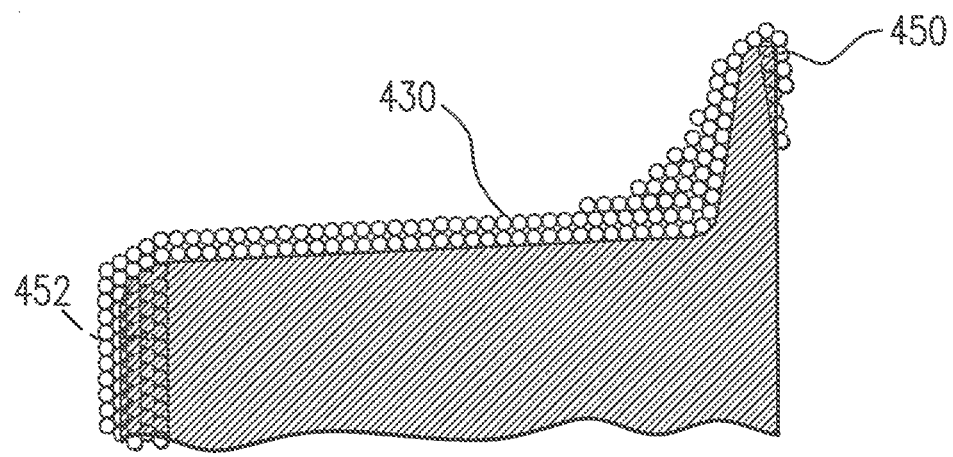
FIG. 4B is a diagram illustrating aggregated annular beads using the welding device on the worn surfaces of the track wheel in the embodiment depicted in FIG. 4A.
Figure 4C:
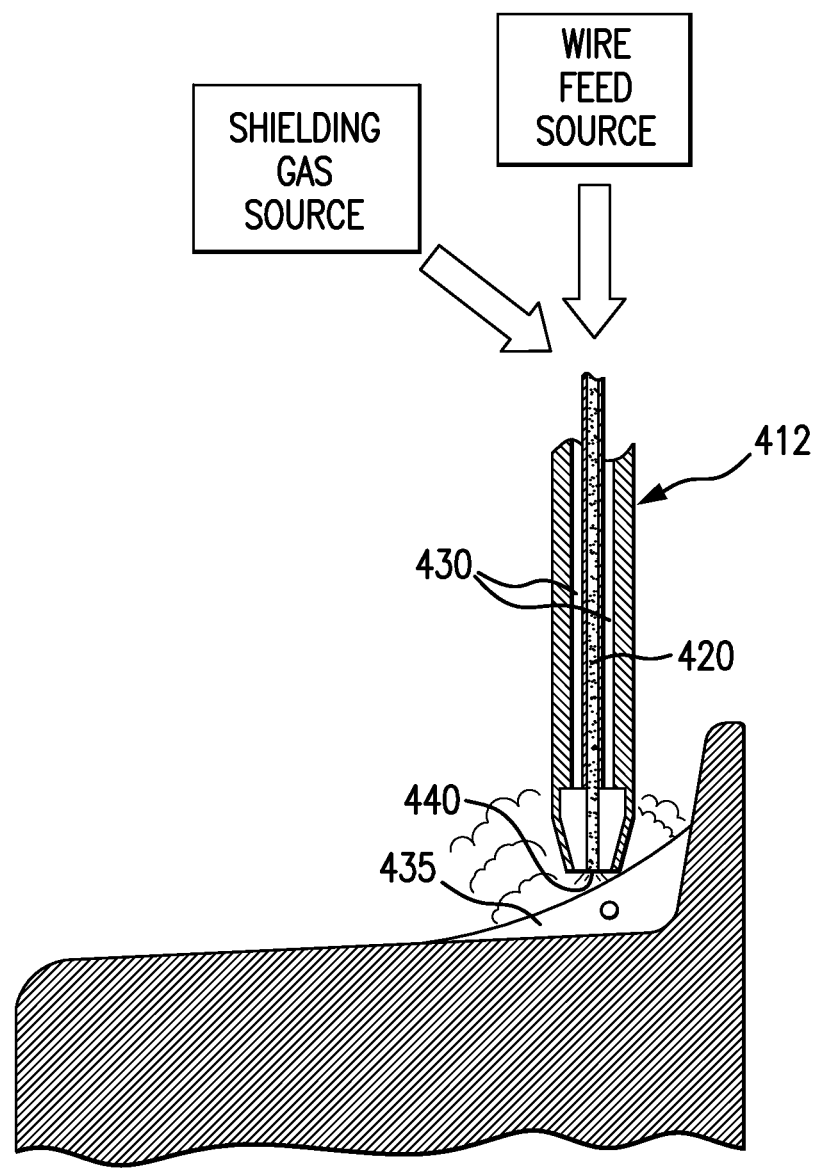
FIG. 4C is a diagram illustrating a welding device reconstituting the worn surfaces of the track wheel in accordance with an alternate embodiment of the present invention.

One example of other alternative welding processes which may be employed is illustrated in FIG. 4C. In this process, a shielded arc welding process is employed to preserve weld integrity. Examples of such processes include metal inert gas (MIG)—such as illustrated in FIG. 4C—and Tungsten inert gas (TIG) processes, among others. As in the submerged arc welding process, a wire-like rod of welding material 420 in the illustrated embodiment is fed through a device 412, along with a stream of shielding gas flux material 430 passed through one or more channel(s) formed in device 412. The shielding gas flux material 430 is introduced at a controlled rate to establish and maintain an airtight flux shield covering 435 about the welding point. The welding of weld bead 430 therefore occurs shielded within this flux covering 435, such that the formation of potentially harmful air pockets and the like in the resulting welded layer is inhibited. As the wheel is turned and welding material 420 applied onto the welding point, the shielding gas flux material is continually fed from the shielding gas source and introduced through the device 412 to continually maintain the shielding cover 435 about the instantaneous welding point.

Referring back to FIG. 4B, when welding the beads 430, a spin welding or welding position manipulator is preferably used to set the wheel in a cradle and rotate in controlled manner, so that the welding beads 430, 450, 452 may be properly applied and aggregated over the wheel's worn regions. Otherwise, the welding device 410 is controlled to let spin and/or rotate relative to the wheel. Alternatively, a combination of movements may be suitably employed for both the worn wheel 400 and the welding device 410.

As mentioned, the welding device 410 is coupled with a welding rod that is electrically energized at the tip 440 to melt into the worn track wheel's 400 metal. While the welding is taking place, the applied flux covering 425, 435 blankets the weld beads 430 to protect them from oxidation and contamination In a preferred embodiment, the welding device 410 and the worn track wheel 400 rotate one relative to the other at a predetermined rate. The rate is controlled by an electronic controller that automatically adjusts the voltage, which is directly related to the length of the arc, and the current, which in turn affects heat input. During the welding process, as shown in FIG. 4B, the welding beads 430 are adaptively aggregated by applying multiple passes of the welding device 410 over the regions worn track wheel 400 so as to compensate for uneven wear at the different worn regions of the wheel. This enables appropriate reconstitution of the worn-out flange 310 and acute taper regions 320, as well as the worn side regions 350 and 352, so that the original profile of the integral taper region 210 on a new, unworn wheel may be recovered (see aggregated beads 430, 450, 452 at respective regions).

As illustrated in FIG. 4B, particular area 320 and 352 of the worn track wheel may require a greater accumulation of beads 430 than over its tread 330 or outer side 350 of the flange. Simply applying the beads uniformly over all surfaces of the wheel would not sufficiently restore the original taper region 210 or full wheel profile. Suitable adaptive control of the welding process is maintained—for example, by accelerating weld bead formation over these areas 320, 350, or by allowing for more passes (of the wheel past the device tip 440)—to form more weld beads 430 as necessary thereat.

It will normally be difficult to reconstitute the integral taper region 210 (and other such excessively worn regions) in one pass, and multiple passes would be necessary. An alternative approach would be to use a welding rod big enough to fully cover the integral taper region 210 at once; however, it is not economically feasible. Moreover, the resultant heat is likely to be excessive, potentially causing unwanted effects on the wheel. In the disclosed embodiment, as each welding bead 430, 450, 452 at the different regions is applied with a welding pass, the welding bead 430 substantially hardens before the next pass comes around. The next pass would thus move the welding device's tip 440 sufficiently to extend the area of coverage with the next applied bead.

In a preferred embodiment, the worn track wheel 400 is preheated to approximately 500° F. before the welding process. During the welding process, air pockets in the weld are mitigated. As mentioned, air pockets in the weld tend to compromise the strength and integrity of the reconstituted wheel, leading to premature chipping and cracking of the weld.

Depending on the specific requirements and resources of each particular application, the amount of time incurred for each pass would vary accordingly. In certain embodiments, with certain types of wheels, 5-15 passes or bead layers varied according to the depth of the integral taper region 210 may be necessary to build up a suitable original profile.

While the term "bead" is used for convenience, the weld resulting from each pass may not be in precisely beaded form. The weld would be applied preferably with a steady contiguous forming of beads, with the next bead "melting" into the previously applied bead. A self-filling or self-leveling of the built-up weld occurs while preventing crevices as the weld material melts into the wheel.

Figure 5:
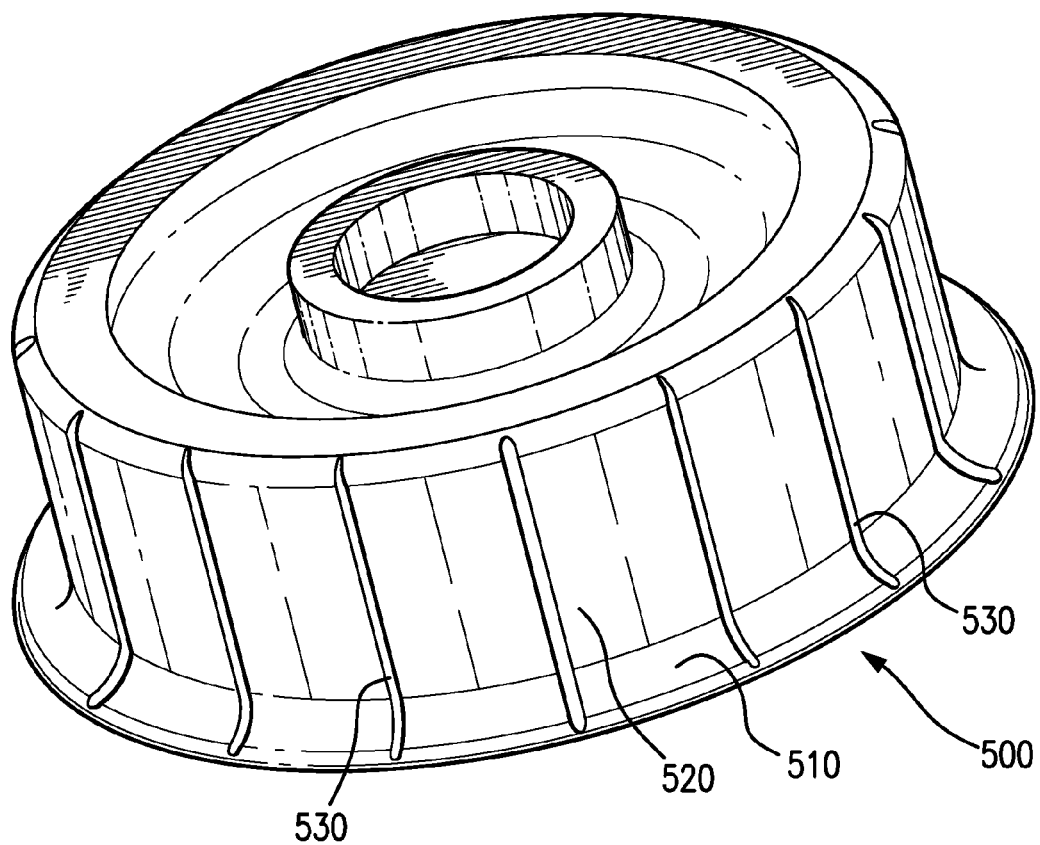
FIG. 5 is a diagram illustrating transverse grooves on the circumferential surface of the worn track wheel in accordance with an exemplary embodiment of the present invention.

In a preferred embodiment, such as illustrated in FIG. 5, a plurality of grooves 530, or scoring notches, are formed on one or more surfaces of the wheel. For example, the contact surface of the worn track wheel 500 including the tread surface 520 and worn-out flange 510 are "scored" in this manner.

The grooves 530 may be mechanically or otherwise formed by a scoring unit employing any suitable means known in the art. The grooves 530 are formed to guard against de-lamination of the weld and to create better adhesion in the restored wheel. The grooves 530 which may be of any shape, contour, or configuration, may be transversely directed or otherwise oriented to have an angular displacement off the central axis of the worn track wheel 500. As mentioned, an x-ray or other suitable process may also be employed to check against cracks or air pockets in the weld which may threaten the integrity of the reconstituted wheel.

Proper care needs to be taken when pre-treating or scoring the surface of the wheel so as not to compromise the structural integrity of the restored wheel. Scoring could be detrimental to the structure or integrity of the worn wheel; however, when appropriate measures are taken, like ensuring suitably limited depth and extent of the grooves 530 and how the grooves are made, the integral taper region 210 and tread surface 520 may be reconstituted with better adhesion of the weld material than might otherwise result. This would contribute to a wheel hardness level possibly even greater than that of the original track wheel 100.

Figure 6A:
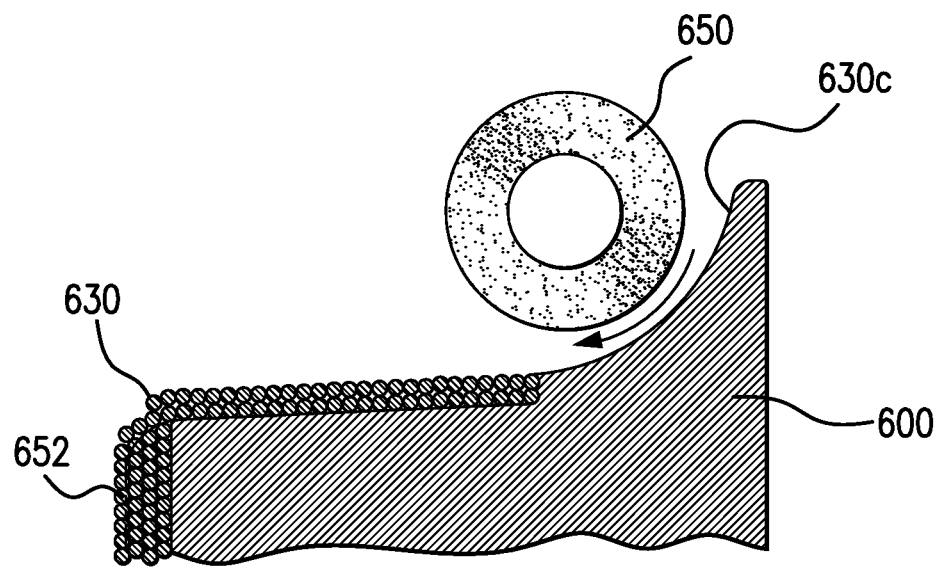
FIG. 6A is a diagram illustrating a grinding wheel milling the aggregated annular beads formed on the track wheel in the embodiment depicted in FIG. 4B.
Figure 6B:
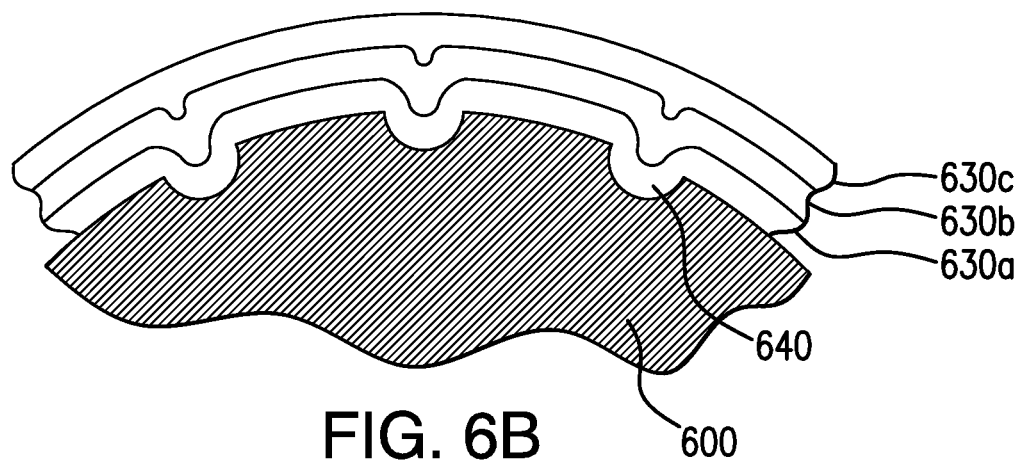
FIG. 6B is a diagram illustrating a profile of the polished track wheel in the embodiment depicted in FIG. 4B.

In one preferred embodiment, after sufficient layers of welding beads 630 have been formed on the welded track wheel 600, the welded track wheel 600 is then subjected to a grinding or other surface processing to smooth out its profile. Such a process is depicted in FIGS. 6A-6B. The surface processing preferably employs a grinding stone 650 or a milling device which is brought down onto the welded track wheel 600. Preferably, the grinding stone 650 is spun, but the welded track wheel 600 may also or alternatively be spun. After a sufficient number of passes between the welded track wheel 600 and the grinding stone 650, a virtually factory-fresh, smooth, polished integral taper region 630c is formed.

Depending on the requirements of a particular application, the welded track wheel 600 may be subjected to heat treatment for further hardening. In any event, the processed wheel is preferably 'decompressed' thermally from its high temperatures. This avoids the deleterious results of metal fatigue and the like, by effecting a gradual cool-down of the wheel as described in preceding paragraphs.

FIG. 6B depicts welded track wheel 600 that includes notches or grooves 640 being covered by a first welded beads layer 630a and a second welded beads layer 630b. Due to the grooves 640 on the contact surface of the welded track wheel 600, the welded layer made up of several welded beads layer 630a, 630b shows a contoured profile. The contoured profile is then ground by the grinding wheel 650 to the polished edge profile 630c. A milling device may also be used to polish the second welded beads layer 630b to form a substantially uniform surface or polished edge layer 630c to reconstitute the track wheel's original integral taper region 210.

During the welding process, the welded beads harden almost immediately upon formation. Given the desired evenness and continuity of the welded beads, the precision and consistency of a welding machine is preferable. Robotic welders, welding manipulators, CNC machines, or any other suitable equipment known in the art may be employed.

In a preferred embodiment as depicted in FIG. 7A, a manipulator or other such device may be employed with a table 760 or other support for holding the worn track wheel 700 as a work piece and spinning the same relative to the welding equipment. One or more microprocessor based controllers may be operably coupled to the table 760 to precisely control the direction, range, angle, speed, and such other aspects of the worn track wheel's movement to effect the necessary passes as the weld is applied. The controller adaptively controls the welding unit to account for the uneven wear on the worn track wheel 700, adaptively aggregating the annular beads 780 at the intersecting area of the flange and tread surface sufficient to reconstitute the original wheel profile. Preferably, the controller speeds up or slows down the relative motion between the worn track wheel 700 and the welding unit, or selectively seeks out the area of the worn track wheel 700 needing more layers of annular beads 780.

In FIG. 7A, a welding unit is controlled by a controller applying weld material to the contact surface of worn track wheel 700. The welding unit includes a welding device 710 and a flux applicator 720 applying welds in form of annular beads 780 to the worn track wheel 700. In this preferred embodiment, the welding unit is stationary while the table 760 supporting the track wheel 700 rotates in place.

FIG. 7B depicts an alternate embodiment having the supported wheel stationary while the welding unit rotates in a circular path about the supported track wheel 700. In FIG. 7B, the supported track wheel 700 may or may not be concur-rently moved to effect the relative displacement necessary between the welding device 710 and the track wheel 700 for successive welding passes.

Other than the welding device structure 710, 720 shown, the welding device employed may alternatively include a welding tip having hooked electrodes. When touched with a welding rod material, voltage and current controlled by the controller creates the electrical energy that melts the rod. The welding rod is typically fed from a rolled wire-loop batch.

At the time of welding, a separate flux applicator is then used to release flux material onto the annular beads 780. The flux produces a gas that forms a gaseous pocket around the welding point which seals out ambient air that could otherwise introduce impurities into the welded material. Much like the granular flux covering shown in the disclosed embodiment, the flux gas preserves a substantially pure environment immediately about the welding point.

Figure 7C:
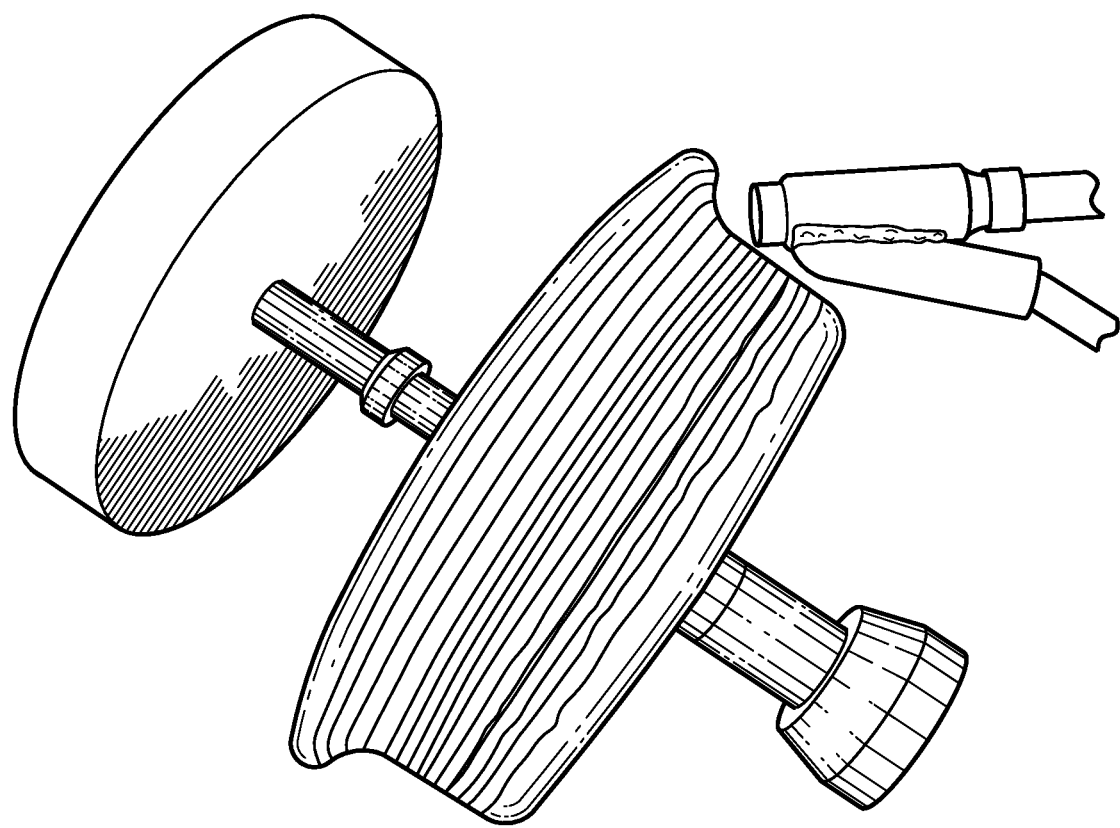
FIG. 7C is a diagram illustrating annular beads being formed on a support structure varying the angle of the worn track wheel.

As illustrated in FIGS. 7A-7A, a system is formed that would generally include: a welding unit loaded with sufficient supply of weld material that includes weld rods, and flux; a table 760 or other support for the workpiece or worn track wheel 700; a cooling unit for cooling the workpiece after applying the weld material; and a controller for precisely determining and controlling the applied current and voltage outputted by the welding device 710. The cooling unit operates to maintain a safe temperature for the worn wheel 700 as welding is applied and this ensures that the wheel itself doesn't become deformed from heat. The cooling unit may employ any suitable means and medium known in the art, including circulated water or gas, heat conductance/sinking structures, and the like. In FIG. 7C, a structure may be employed that holds the worn track wheel 700 at an angle so that the weld material can be easily applied.

In one embodiment, the disclosed system is used as a wheel resurfacing system for resurfacing a worn railway wheel 300 substantially to its original profile (integral taper region 210 and tread surface 120). A support 760 may be used for maintaining the worn track wheel 700. The track wheel 700 includes a circumferential surface defining a first surface projecting or worn-out flange 110 from a second surface or tread surface 120. The welding device may include an arc welder.

In another embodiment, the disclosed system is used to also fortify and resurface the worn track wheel 700 to its original profile. A welding material having a Rockwell hardness greater than the worn railway wheel 700 is selected in forming a welded layer by adaptively aggregating annular beads along the circumferential surface made up of worn-out flange 310, acute taper region 320 and worn tread surface 330. For example, a typical rail wheel used in railroad maintenance applications ranges in Rockwell hardness of 28-32 but welding material used may have a Rockwell hardness of greater than 42. The annular beads disproportionately aggregate at an intermediate contour between the worn-out flange 310 and acute taper region 320, whereby the welded layer forms a curvilinear profile slanted away from the worn-out flange 310.

In a preferred embodiment, a controller, which may be microprocessor controlled, is programmed to selectively aggregate the annular beads at specific positions along the circumferential surface of the worn railway wheel 700. In an alternative embodiment, the controller is used to control the relative displacement of the worn railway wheel 700 to the welding device 710 so as to allow multiple passes of the welding device 710 over a previously welded annular bead which results in "stacking" of the annular beads. The controller may selectively control a plurality of parameters to adaptively aggregate the plurality of annular beads including a predetermined rate of relative rotation between the welding unit and support unit, position of the welding unit, current and voltage of the welding device, standoff of the welding device, relative angle of the welding device to the worn wheel, dwell time of the welding device etc.

In another preferred embodiment, the metallurgical composition of the railroad railway wheel 700 may be determined before the step of adaptively aggregating the annular beads 780. A solvent may also be used to clean the wheel before adaptively aggregating the annular beads 780.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for resurfacing a worn railway wheel substantially to an original profile, comprising the steps of:

supporting the worn railway wheel and a welding device, whereby the worn railway wheel and the welding device rotate one relative to the other at a predetermined rate;

selectively actuating the welding device and concurrently adjusting axial and radial displacement relative to a wheel center between the welding device and the railway wheel, the welding device being thereby controlled to adaptively aggregate a plurality of annular beads formed from a welding material radially and axially displaced along a circumferential surface of the worn railway wheel having a curved profile and form a welded layer of varied thickness thereon, the circumferential surface defining at least a flange and a tread surface, each annular bead extending to substantially encircle a portion of the circumferential surface, whereby the welded layer forms a curvilinear profile tapered along the circumferential surface; and, surface processing the welded layer to define a substantially smooth surface contour and thereby substantially reconstitute the worn railway wheel to the original profile.

2. The method for resurfacing the worn railway wheel as recited in claim 1, further comprising the step of mechanically disturbing the worn railway wheel to form a plurality of scoring grooves on the circumferential surface before the step of adaptively aggregating the annular beads.

3. The method for resurfacing the worn railway wheel as recited in claim 1, further comprising the step of preheating the worn railway wheel to a predetermined temperature before the step of adaptively aggregating the annular beads.

4. The method for resurfacing the worn railway wheel as recited in claim 1, further comprising the steps of determining a metallurgical composition of the worn railway wheel and imaging the worn railway wheel for detecting internal faults therein before the step of adaptively aggregating the annular beads.

5. The method for resurfacing the worn railway wheel as recited in claim 1, whereby the worn railway wheel thermally decompressed after weld-processing for progressively controlled cooling.

6. The method for resurfacing the worn railway wheel as recited in claim 1, wherein the circumferential surface includes laterally opposed side regions respectively disposed at outer sides of the flange and tread regions.

7. The method for resurfacing the worn railway wheel as recited in claim 1, wherein the welding material is applied by shielded arc welding onto the circumferential surface of the worn track wheel.

\* \* \* \* \*